US012195294B2

(12) United States Patent
Mitsuno

(10) Patent No.: US 12,195,294 B2
(45) Date of Patent: Jan. 14, 2025

(54) IMAGE FORMING APPARATUS INCLUDING WRITER WRITING DATA TO WIRELESS TAG

(71) Applicant: TOSHIBA TEC KABUSHIKI KAISHA, Tokyo (JP)

(72) Inventor: Keigo Mitsuno, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/126,682

(22) Filed: Dec. 18, 2020

(65) Prior Publication Data

US 2021/0309484 A1 Oct. 7, 2021

(30) Foreign Application Priority Data

Apr. 1, 2020 (JP) ................................ 2020-066044

(51) Int. Cl.

*G03G 15/00* (2006.01)
*B65H 43/04* (2006.01)
*G03G 21/16* (2006.01)

(52) U.S. Cl.

CPC ............. *B65H 43/04* (2013.01); *G03G 15/70* (2013.01); *B65H 2511/512* (2013.01); *B65H 2553/52* (2013.01); *B65H 2557/11* (2013.01); *G03G 15/6552* (2013.01); *G03G 21/1657* (2013.01); *G03G 2215/00548* (2013.01)

(58) Field of Classification Search

CPC ...................................................... G03G 15/70
See application file for complete search history.

(56) References Cited

U.S. PATENT DOCUMENTS 8,054,484 B2 11/2011 Hosokawa
8,099,038 B2 1/2012 Matoba
2007/0256586 A1* 11/2007 Bonikowski ........... B65H 43/04 101/484
2019/0141210 A1* 5/2019 Eiiliott ............... H04N 1/32138
2020/0171550 A1* 6/2020 Sakatani ............ G03G 15/6538

FOREIGN PATENT DOCUMENTS

JP H0879499 A * 3/1996
JP 2001-096814 A 4/2001
JP 2004-224453 A 8/2004
(Continued)

OTHER PUBLICATIONS

Machine translation of JP H0879499 (Year: 1996).*
Notice of Reasons for Refusal dated Nov. 14, 2023 issued in JP Application No. 2020-066044, with English translation, 8 pages.

*Primary Examiner* — Walter L Lindsay, Jr.
*Assistant Examiner* — Andrew V Do
(74) *Attorney, Agent, or Firm* — FOLEY & LARDNER LLP

(57) ABSTRACT

An information processing apparatus includes a sheet holder, a conveyor, a wireless writer, a wireless reader, and a controller. The sheet holder accommodates a sheet. The conveyor conveys the sheet from the sheet holder. The wireless writer writes data to a wireless tag on a first sheet. The wireless reader reads data from the wireless tag on the first sheet. The controller ejects a second sheet from the sheet holder when the data written in the first sheet by the writer and the data read from the first sheet by the reader are different from each other.

14 Claims, 6 Drawing Sheets

(56) References Cited

FOREIGN PATENT DOCUMENTS

| | | | | |
|---|---|---|---|---|
| JP | 2005-081813 | A | | 3/2005 |
| JP | 2005-205747 | A | | 8/2005 |
| JP | 2007091298 | A | * | 4/2007 |
| JP | 2008-307752 | A | | 12/2008 |
| JP | 2009-015145 | A | | 1/2009 |
| JP | 2009-292580 | A | | 12/2009 |

* cited by examiner

IMAGE FORMING APPARATUS INCLUDING WRITER WRITING DATA TO WIRELESS TAG

CROSS-REFERENCE TO RELATED APPLICATION

This application is based upon and claims the benefit of priority from Japanese Patent Application No. 2020-066044, filed on Apr. 1, 2020, the entire contents of which are incorporated herein by reference.

FIELD

Embodiments described herein relate generally to an image forming apparatus that forms an image on a sheet having an RFID tag.

BACKGROUND

In the related art, an image forming apparatus capable of performing electrically writing on an RFID tag by wireless communication and forming an image with a toner or the like on a sheet having the RFID tag is known. In such an image forming apparatus, a special pattern indicating writing failure is printed on the sheet in order to prevent the sheet on which the writing to the RFID tag is not normally performed from being confused with the sheet on which the writing is normally performed. However, in the method, it takes time and effort to search for a sheet with writing failure among the ejected sheets. In addition, in a case where a page causing the writing failure is reprinted, it takes time and effort to identify which page needs to be reprinted.

DETAILED DESCRIPTION

An object to be solved by the present disclosure, according to at least one embodiment, is to provide an image forming apparatus that makes it easy to visually identify a sheet in which writing failure to an RFID tag occurs.

In general, according to at least one embodiment, an information processing apparatus includes a sheet accommodating unit (holder), a conveying unit (conveyor), a wireless writing unit (writer), a wireless reading unit (reader), and a (controller). The sheet accommodating unit accommodates a sheet. The conveying unit conveys the sheet from the sheet accommodating unit. The wireless writing unit writes data to a wireless tag on the first sheet. The wireless reading unit reads data from the wireless tag on the first sheet. The control unit ejects a second sheet from the sheet accommodating unit when the data written in the first sheet by the writing unit and the data read from the first sheet by the reading unit are different from each other.

Hereinafter, at least one embodiment for carrying out the exemplary embodiment will be described with reference to the drawings.

First Embodiment

In the embodiment, an image forming apparatus 1 will be described as an example.

The image forming apparatus 1 is, for example, a multifunction peripheral (MFP) capable of forming an image on a sheet with a toner.

Figure 1:
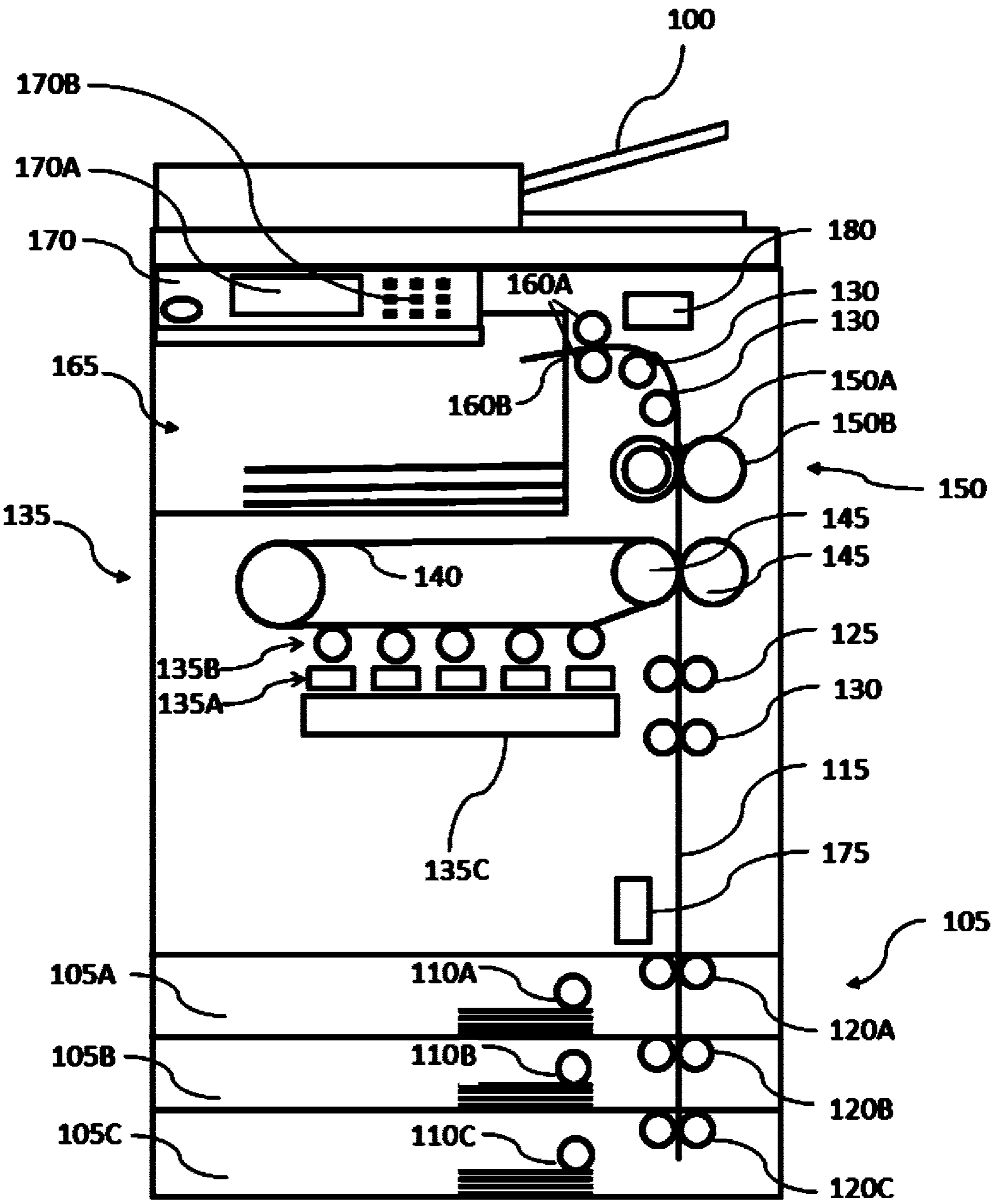
FIG. 1 is a cross-sectional view of an image forming apparatus according to a first embodiment.

FIG. 1 is a cross-sectional view of the image forming apparatus 1 according to the first embodiment.

A reading unit (reader) 100 is a scanner that reads an image of a target sheet. The reading unit 100 stores image information obtained by reading as image data in a storage unit 185 described later. The image data stored in the storage unit 185 may be transmitted to another information processing apparatus via a network. In addition, the image data stored in the storage unit 185 may be formed on another sheet by an image forming unit 135 described later.

A sheet accommodating unit (sheet holder) 105 is provided in a lower portion of a housing and includes a plurality of feeding cassettes 105A, 105B, and 105C. Each of the feeding cassettes 105A, 105B, and 105C accommodates sheets of a predetermined size and type. The settings of the feeding cassettes 105A, 105B, and 105C can be changed as appropriate. The feeding cassette 105A, 105B, and 105C include pickup rollers 110A, 110B, and 110C, respectively. Each of the pickup rollers 110A, 110B, and 110C takes out one sheet from each of the paper feed cassettes 105A, 105B, and 105C. The pickup rollers 110A, 110B, and 110C convey the taken-out sheets to a conveyance path 115.

The conveyance path 115 is a path in which the sheets are conveyed. The conveyance path 115 is a path for conveying the sheets from the sheet accommodating unit 105 to an ejecting unit 160 via the image forming unit 135 and a fixing unit described later.

The conveying unit 115A includes paper feed rollers 120A, 120B, and 120C, a registration roller 125, a plurality of convey rollers 130, and a plurality of convey motors for driving the convey rollers. The paper feed rollers 120A, 120B, and 120C convey the sheet conveyed from the paper feed cassette 105 by the pickup rollers 110A, 110B, and 110C to the registration roller 125 along the conveyance path 115, respectively.

The registration roller 125 conveys the sheet to a transfer roller 145 in coincidence with the timing when the image forming unit 135, which will be described later, transfers the image formed by the toner on the transfer belt onto the surface of the sheet. A plurality of the convey rollers 130 are provided in the conveyance path 115 to convey the fed sheet to the ejecting unit 160 along the conveyance path 115.

The image forming unit 135 is arranged at the upstream of a fixing unit 150 along the conveyance path 115. The image forming unit 135 includes a developing unit 135A, a photoreceptor drum 135B, an exposing unit 135C, and a charging unit 135D (not illustrated) as an image forming unit. The charging unit 135D uniformly charges the surface (photoreceptor layer) of the photoreceptor drum 135B. The exposing unit 135C forms an electrostatic latent image on the surface of the photoreceptor drum 135B by irradiation with laser light. The developing unit 135A performs developing the electrostatic latent image by adding a toner. In addition, the image forming unit 135 includes a transfer belt 140 and the transfer roller 145 as a transfer unit. The toner developed by the image forming unit is transferred to the transfer belt 140 (primary transfer). The transfer roller 145 transfers the image formed on the transfer belt 140 onto the sheet (secondary transfer). The toner transferred to the sheet is fixed to the sheet by the fixing unit 150 described later.

As described above, the image forming unit 135 forms an image on the surface of the sheet by the toner. The toner in the embodiment includes a non-decolorable recording agent toner (hereinafter, a normal toner) and a decolorable recording agent toner (hereinafter, a decolorable toner). The normal toner is, for example, a toner of yellow (Y), magenta (M), cyan (C), black (K), or the like. The decolorable toner is a colored toner similar to a normal toner and is, for example, blue. The decolorable toner is decolorized by being heated at a decoloring temperature higher than a fixing temperature at which the normal toner is fixed on the sheet.

The fixing unit 150 includes a heating roller 150A and a pressurizing roller 150B. The heating roller 150A applies heat to the sheet from the first surface side of the sheet. The pressure roller 150B applies pressure to the sheet from the second surface side of the sheet. The fixing unit 150 fixes the toner transferred to the sheet by the heat and pressure during forming the image.

The ejecting unit 160 includes an ejecting roller 160A, an ejecting port 160B, and an ejecting tray 165. The ejecting roller 160A ejects the conveyed sheet from the ejecting port 160B to the ejecting tray 165. The ejecting tray 165 is loaded with the ejected sheets.

A control panel 170 includes a display unit 170A and an operation unit 170B. The display unit 170A is a display device such as a liquid crystal display and an organic EL (Electro Luminescence) display. The display unit 170A displays various pieces of information on the image forming apparatus 1. The operation unit 170B includes a plurality of buttons and the like and receives user operations. The operation unit 170B outputs a signal corresponding to the operation performed by the user to a control unit 180. In addition, the display unit 170A and the operation unit 170B may be configured as an integrated touch panel.

The RFID writer 170 is an example of a wireless writing unit. The RFID writer 170 performs electrically writing of data to the RFID tag by wirelessly communicating with the RFID tag provided on the sheet to be conveyed from the sheet accommodating unit 105.

An RFID reader 175 is an example of a wireless reading unit. The RFID reader 175 is arranged at the downstream of the RFID writer 170 along the conveyance path 115, and reads the data electrically written to the RFID tag by wirelessly communicating with the RFID tag provided on the sheet to be conveyed.

Figure 2:
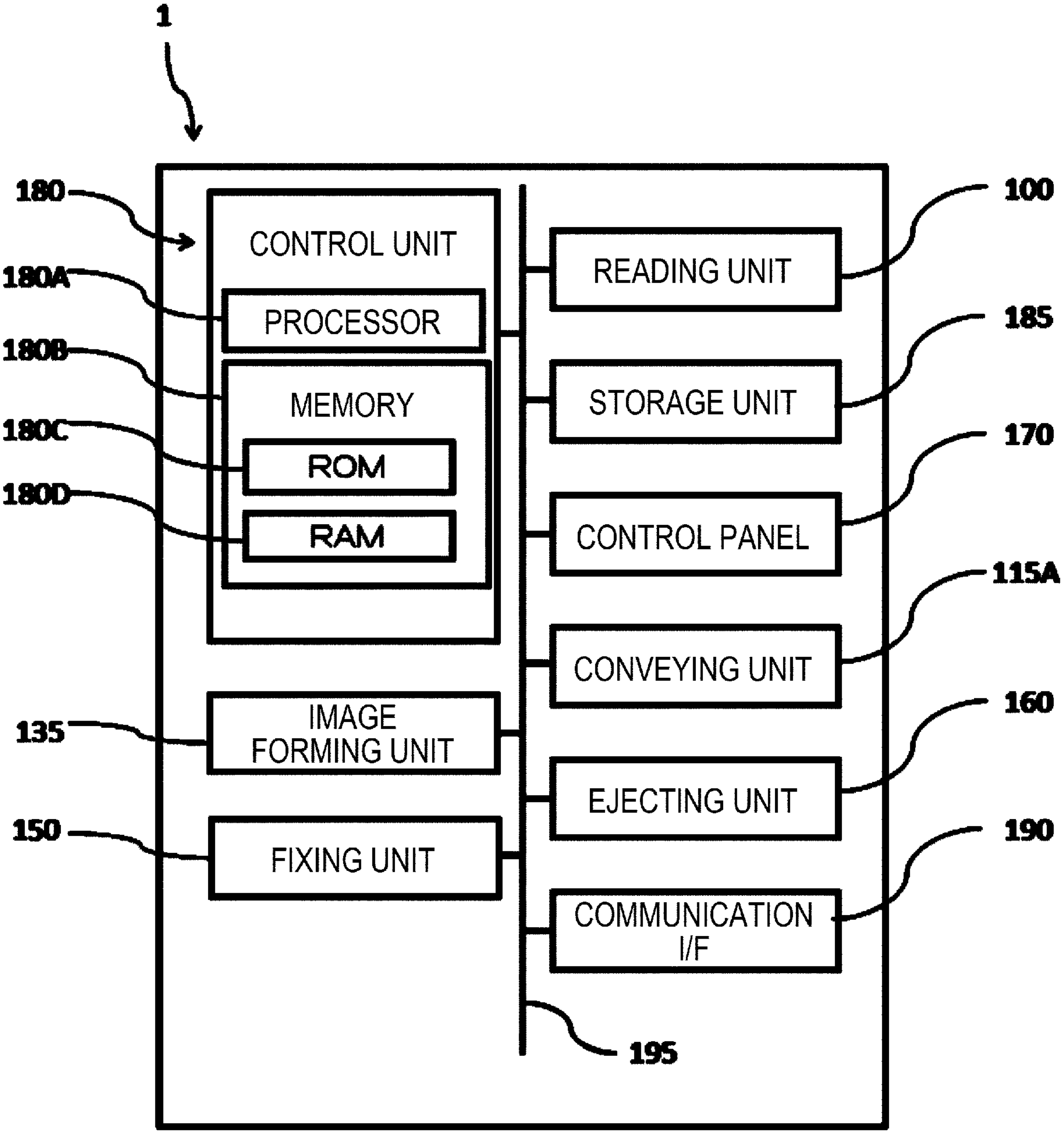
FIG. 2 is a control block diagram of a hardware configuration of an image forming apparatus according to a first embodiment.

FIG. 2 is a block diagram illustrating a hardware structural configuration of the image forming apparatus 1. The image forming apparatus 1 includes the reading unit 100, the conveying unit 115A, the image forming unit 135, the fixing unit 150, the control panel 170, the RFID writer 170, the RFID reader 175, the control unit 180, the storage unit 185, and a communication interface (I/F) 190. Each unit of the image forming apparatus 1 is connected via a bus line 195.

The control unit 180 has a processor 180A including a CPU (Central Processing Unit) or an MPU (Micro Processing Unit) and a memory 180B. The memory 180B is, for example, a semiconductor memory and has a ROM (Read Only Memory) 180C that stores various control programs and a RAM (Random Access Memory) 180D that provides a temporary work area to the processor 180A. The RAM 180D may temporarily store the image read by the reading unit 100. The control unit 180 controls each unit of the image forming apparatus 1 based on various control programs and the like stored in the ROM 180C.

The storage unit 185 stores the image data read by the reading unit 100. The storage unit 185 may be, for example, a hard disk drive, other magnetic storage device, an optical storage device, a semiconductor storage device such as a flash memory, or any combination thereof.

The communication I/F 190 is an interface that connects to an external apparatus. The communication I/F 190 communicates with an external apparatus on the network via appropriate wireless or wired communication, such as IEEE802.15, IEEE802.11, IEEE802.3, or IEEE3304 such as Bluetooth (registered trade mark), infrared connection, or an optical connection. The communication I/F 190 may further include a USB connection unit to which a USB standard connection terminal is connected, a parallel interface, and the like. The control unit 180 communicates with the external apparatus via the communication I/F 190.

Next, the ejection of the RFID tagged sheet will be described with reference to FIG. 3. The image forming apparatus 1 according to at least one embodiment ejects a sheet (second sheet) which has an orientation rotated 90 degrees with respect to the RFID tagged sheet in a case where the writing of data by the RFID writer 170 is not normally performed. In addition, in the following description, the RFID tagged sheet will be referred to as a first sheet RS. In addition, the first sheet RS is indicated as RS1, RS2, and RS3 in order of being ejected. In addition, in the following example, the first sheets RS1 to RS3 are blank sheets, but formation of an image by a toner may be performed.

Figure 3A:
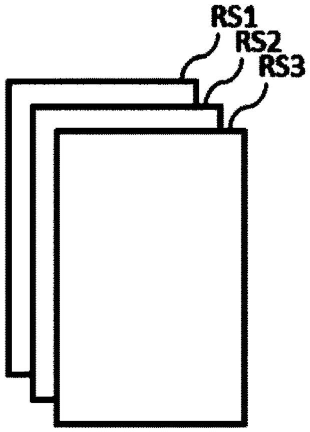
FIGS. 3A, 3B and 3C are plan views illustrating a first sheet RS and a second sheet S' in the first embodiment.

FIG. 3A illustrates a state after the three first sheets RS have been ejected to the ejecting tray 165. With respect to the first sheets RS1 to RS3, the processes of writing of data to the RFID tags provided on the respective sheets are performed by the RFID writer 170. Herein, it is assumed that the writing of data to the RFID tag of the first sheet RS3 is not normally performed.

Figure 3B:
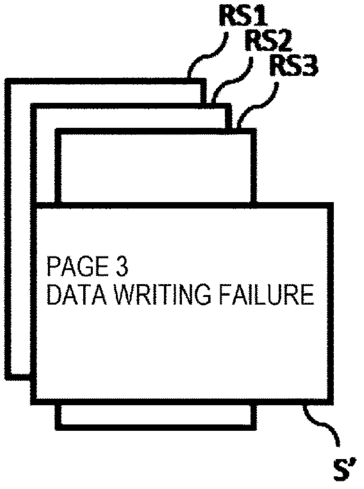

In FIG. 3B, a second sheet S' of which orientation is rotated 90 degrees is mounted on the first sheets RS1 to RS3 illustrated in FIG. 3A. The second sheet S' may be a normal sheet S without an RFID tag provided or may be a first sheet RS with an RFID tag provided. The second sheet S' is a sheet for indicating that the writing of data to the immediately preceding first sheet RS has failed. That is, the second sheet S' is ejected so as to interrupt the job if the writing of data to the first sheet RS has failed irrespective of the job executed by the image forming apparatus 1.

Figure 3C:
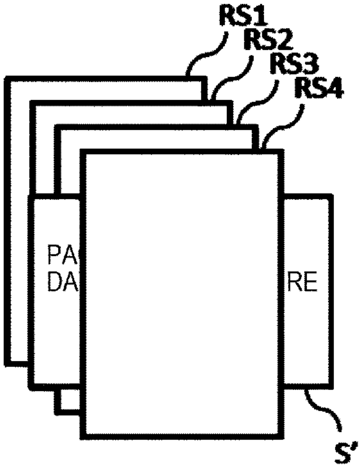

Next, in FIG. 3C, the first sheet RS4 having the same orientation as the first sheets RS1 to RS3 is mounted on the first sheets RS1 to RS3 and the second sheet S' illustrated in FIG. 3B. The image forming apparatus 1 re-executes the process executed on the first sheet RS3 as the process for the first sheet RS4. In addition, the job for the first sheet RS3 may not be re-executed, and the process for the next sheet may be performed.

In this manner, in a case where writing to the RFID tag is not normally performed, since the sheet which has an orientation rotated 90 degrees next to the sheet is ejected, it is possible to visually determine that the sheet in which the writing of data is not normally performed.

Figure 4:
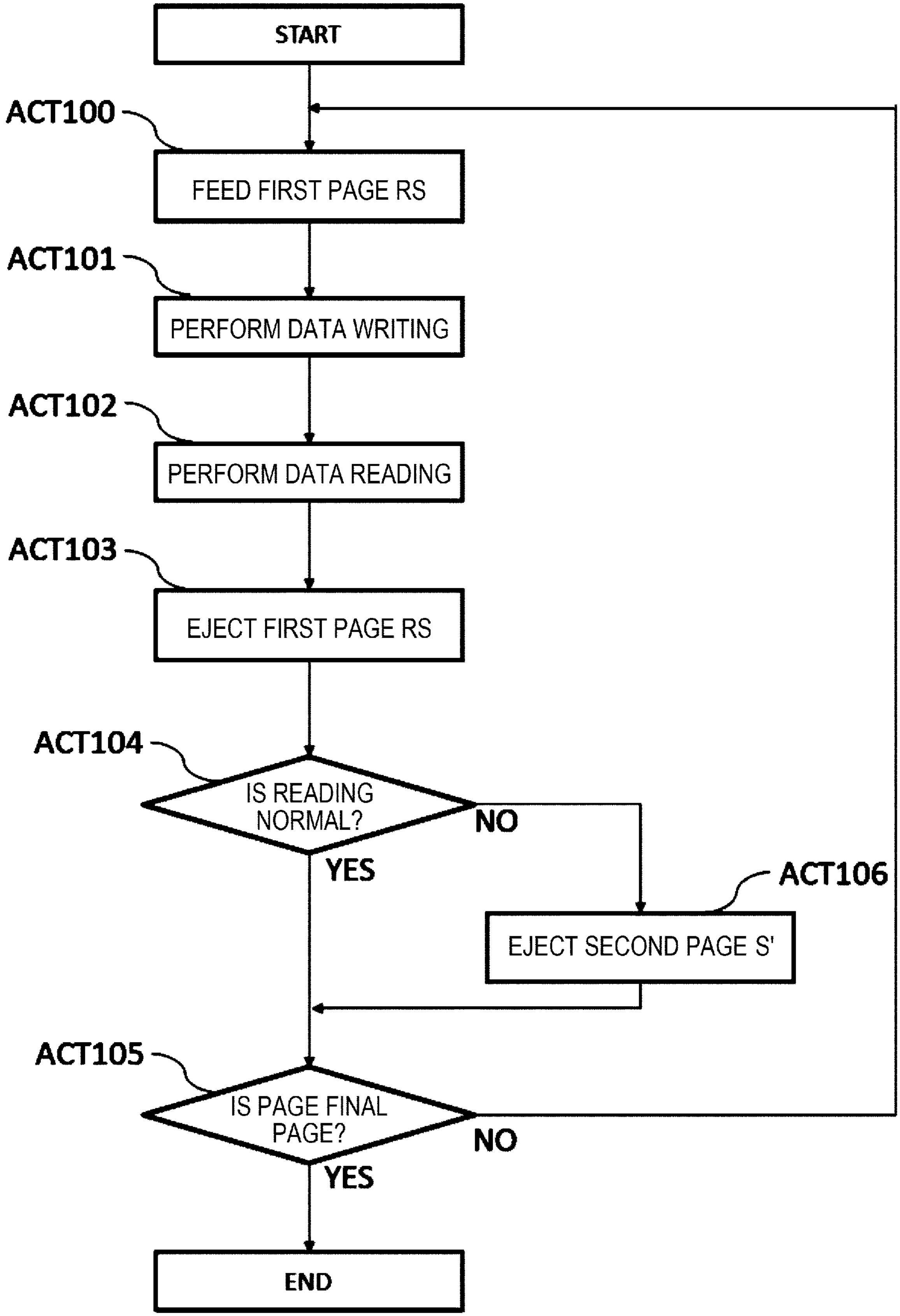
FIG. 4 is a flowchart illustrating a data writing process according to the first embodiment.

FIG. 4 is a flowchart illustrating a process of writing of data to the first sheet RS by the image forming apparatus 1 according to at least one embodiment. If the image forming apparatus 1 receives a job execution instruction from the user, the image forming apparatus 1 starts the following data writing process.

First, the control unit 180 conveys the first sheet RS along the conveyance path 115 by the conveying unit 115A (ACT100). The control unit 180 performs writing of data to the RFID tag on the first sheet RS by the RFID writer 170 (ACT101).

After that, the control unit 180 performs reading of data by the RFID reader 175 for the first sheet RS to be conveyed (ACT102). After that, the control unit 180 ejects the first sheet RS to the ejecting tray 165 by the ejecting unit 160 (ACT103).

The control unit 180 determines whether the data read by the RFID reader 175 is normal (ACT104). In a case where the read data is normal (YES in ACT104), the process proceeds to ACT105. In a case where the read data is not normal (NO in ACT 104), the control unit 180 ejects the second sheet S' from the sheet accommodating unit 105 to the ejecting tray 165 (ACT 106), and the process proceeds to ACT 105.

In ACT 105, the control unit 180 determines whether the job has been executed up to the final page (ACT 105). In a case where the job is not the final page (NO in ACT105), the process returns to ACT100. Ina case where the job is the final page (YES in ACT105), a series of processes end.

Accordingly, since the sheet which has an orientation rotated 90 degrees is ejected so as to be continuous with the sheet in which the writing of data was not normally performed, the user can visually determine the sheet in which the writing was not normally performed. Accordingly, it is possible to prevent the sheet from being used by mistake.

Second Embodiment

Next, a second embodiment will be described. If executing a job of a plurality of copies, an image forming apparatus 2 according to the second embodiment ejects the second sheet S' every time the final first sheet RS of each copy is ejected. In addition, in the following description, the copy indicates the number of times the process of printing the same image data and writing of the data to the RFID tag is repeated. For example, if two copies of print data including five pages are to be printed, the image forming apparatus repeats printing of five pages twice.

In addition, the job indicates a printing process executed by the image forming apparatus 2 and a process of writing of data to the RFID tag with one command. For example, in a case where the image forming apparatus 2 receives a command to print three copies of print data including five pages as one job, the image forming apparatus 2 considers repetition of three times of printing for five pages to be execution of one job.

In the following example, the image forming apparatus 2 sets the writing of data to the three first sheets RS as one copy process and executes the process for a plurality of copies. In this case, first, the image forming apparatus 2 performs writing of data to the three first sheets RS1 to RS3. Then, after the third first sheet RS is ejected, the second sheet S' is rotated 90 degrees with respect to the first sheets RS1 to RS3 and ejected.

Furthermore, the success and failure information indicating success and failure of writing of data is described in the second sheet S' so that it can be determined whether or not the writing of data to each first sheet RS is normal. In addition, in the following description, the sheet on which the success and failure of writing of data is described is referred to as a second sheet S.

In the image forming apparatus 2, each time the reading of data from the first sheet RS by the RFID reader 175 is performed, the page number of the first sheet RS to be read and the result of the success and failure of reading are associated with each other and stored in the storage unit 185.

If the process for one copy is completed, the control unit 180 describes the writing success and failure information on each page in the copy based on the information stored in the storage unit 185 on the second sheet S" and ejects the second sheet.

After that, the image forming apparatus 2 executes a job for a second copy. That is, the fourth first sheet RS4 is ejected on the ejected second sheet S'. The image forming apparatus 2 repeats the process until the process for all the copies is executed.

It is preferable that the image forming apparatus 2 ejects the second sheet S' if the process for each copy is completed, even in a case where the writing of data to the first sheet RS for each copy is normally performed. This makes it easy for the user to identify which page of which copy the sheet in which the data writing failure occurs is a sheet of. However, the timing of ejecting the second sheet S' is not limited thereto. For example, the second sheet S' may be ejected only in a case where the process for the copy where the writing of data is not normally performed is completed.

Figure 5A:
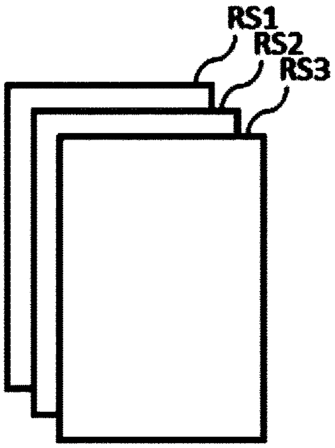
FIGS. 5A, 5B and 5C are plan views illustrating a first sheet RS and a second sheet S" in the second embodiment.

The ejecting of the RFID tagged sheet will be described with reference to FIGS. 5A, 5B, and 5C. FIG. 5A illustrates a state after the three first sheets RS are ejected to the ejecting tray 165. That is, the ejecting tray 165 after the process for one copy is completed is illustrated. In this example, it is assumed that the writing of data to the first sheet RS' 2 fails.

Figure 5B:
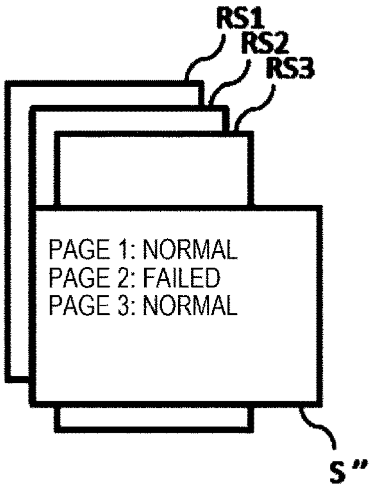

FIG. 5B is a diagram illustrating that, after the process for the first sheets RS1 to RS3 is completed, the second sheet S" rotated 90 degrees with respect to the first sheets RS1 to RS3 are ejected. On the second sheet S", success and failure information indicating success and failure of writing of data to the first sheets RS1 to RS3 is described.

Figure 5C:
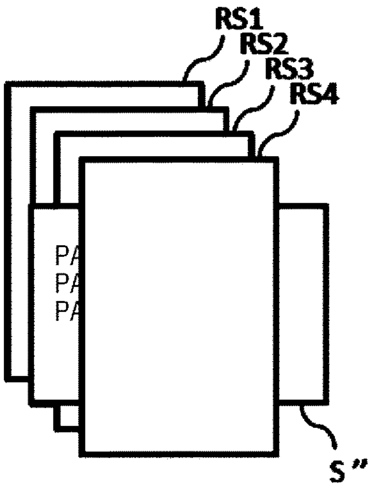

In FIG. 5C, the first sheet RS4 is ejected in the same direction as the first sheets RS1 to RS3 so as to overlap the first sheets RS1 to RS3 and the second sheet S.

Figure 6:
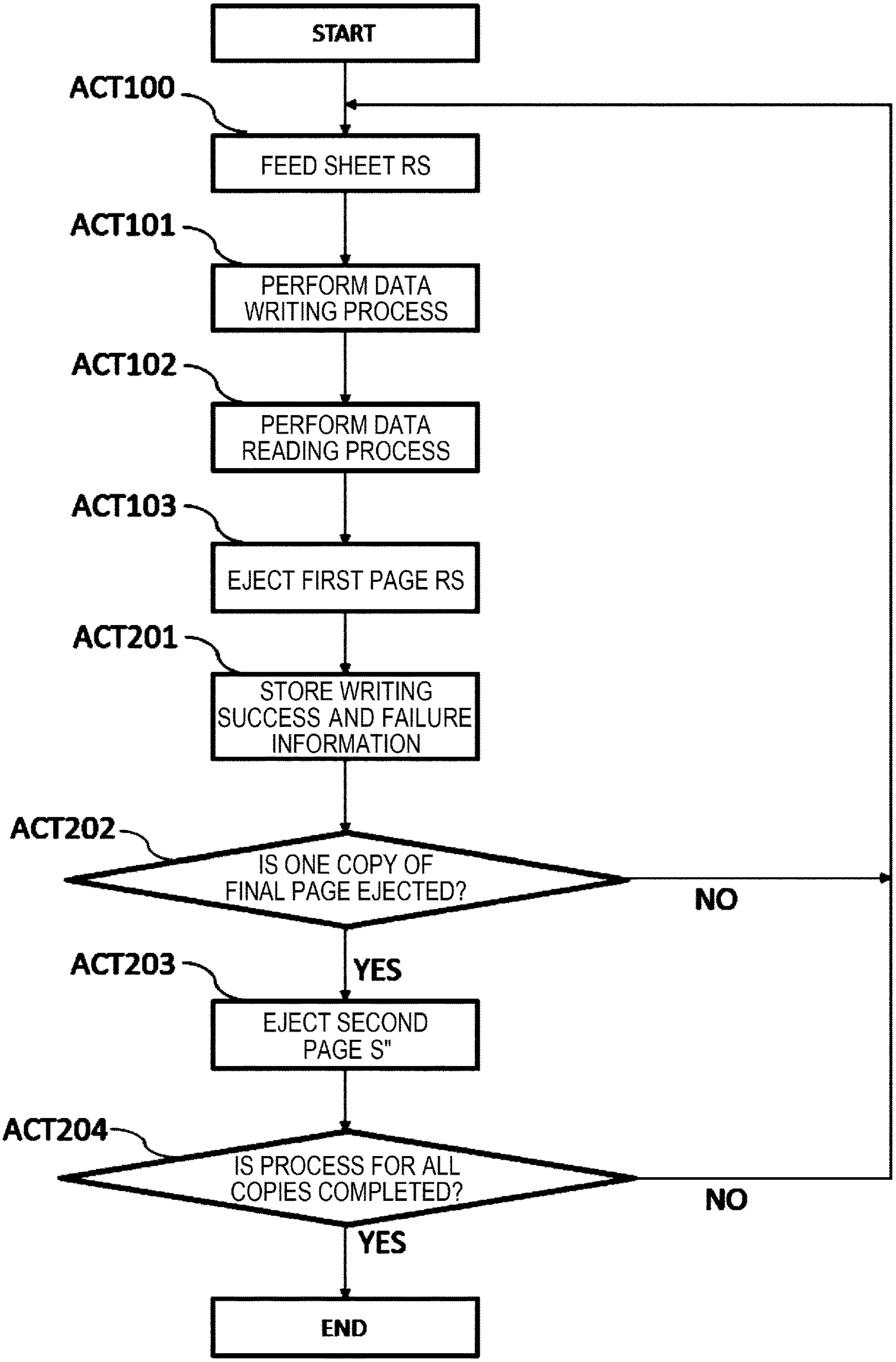
FIG. 6 is a flowchart illustrating a data writing process according to the second embodiment.

FIG. 6 is a flowchart illustrating a process of writing of data to the first sheet RS by the image forming apparatus 2 in a modified example of the embodiment. In addition, the same processes as in FIG. 4 are denoted by the same numbers, and the description thereof will be omitted. If the image forming apparatus 2 receives a job execution instruction from the user, the image forming apparatus 2 starts the following data writing process.

After the first sheet RS is ejected in ACT 103, the control unit 180 stores the page number and the success and failure information in the storage unit 185 (ACT201).

Next, it is determined whether the ejected sheet is the final page of the copy, and in a case where the ejected sheet is the final page (YES in ACT202), the second sheet S" is ejected (ACT203), and the process proceeds to ACT204. In a case where the ejected sheet is not the final page of the copy (NO in ACT202), the process returns to ACT100.

In ACT204, the control unit 180 determines whether the process for all the copies is completed, and in a case where the process for all the copies is not been completed (NO in ACT203), the process returns to ACT100. If the process for all copies is completed (YES in ACT204), a series of processes end.

Accordingly, in the image forming apparatus 2 having a high sheet processing speed, even in a case where the ejecting of the second sheet S' is not in time after the writing fails, the second sheet S' indicating the success and failure of the writing of data can be ejected, and thus, the user can visually determine the sheet on which the writing of data occurs.

In addition, the above-described example, the sheet S rotated 90 degrees as the second sheet S' and the second sheet S" is ejected, but the present disclosure is not limited thereto. For example, the sheet S stored in the sheet accommodating unit 105 may be ejected in a state of being rotated 90 degrees in advance. In addition, a sheet having a size larger than the sheet used in the job may be ejected as the second sheet S'.

In addition, in the above-described example, even in a case where the writing of data to the first sheet RS fails, the job is restarted after the second sheet S' is ejected, but the job may be stopped. Accordingly, the user can reduce time and effort to search for a sheet with writing failure.

In addition, a mark may be added by forming an image with toner or the like on the edge of the second sheet S". For example, in a case where there is a sheet in which writing fails, if red is added to the edge of the second sheet S", even though a plurality of second sheets S" are ejected, the user can easily search for a sheet in which writing failure occurs.

In addition, in the above-described example, the RFID writer and the RFID reader are provided separately, but the exemplary embodiment is not limited thereto. An RFID reader and writer in which the RFID writer and the RFID reader are integrated may be used. In this case, after the RFID reader and writer performs writing of data, the RFID reader and writer performs reading of data. For example, by using this RFID reader and writer instead of the RFID writer 175 of FIG. 1, it is possible to check whether or not the writing of data is normally performed immediately after the writing of data has been performed.

While certain embodiments have been described, these embodiments have been presented by way of example only, and are not intended to limit the scope of the disclosure. Indeed, the novel embodiments described herein may be embodied in a variety of other forms. Furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing apparatus comprising:

a sheet holder arranged to accommodate a sheet;

a conveyer configured to convey the sheet from the sheet holder;

a printer configured to print an image on the conveyed sheet;

a writer configured to write data to a wireless tag on a plurality of first sheets;

a reader configured to read data from the wireless tag on the first sheets after the writer writes data to the wireless tag; and a memory configured to store a result of success and failure of reading of the wireless tag on the first sheets by the reader; and a controller configured to eject a second sheet after ejecting a last sheet in each of the plurality of sets of first sheets when executing a job of the first sheets, the job including a same data writing process on each of the plurality of sets of first sheets, wherein the controller being configured to allow, based on the result of success and failure of reading, the printer to print information on the second sheet for each first sheet of the set of first sheets to indicate that the writer fails to write data.

2. The apparatus according to claim 1, further comprising:

a printer configured to print an image on the conveyed sheet, wherein the controller is configured to allow the printer to print information on the second sheet to indicate that the writer fails to write data.

3. The apparatus according to claim 1, wherein the conveyor comprises a plurality of rollers.

4. The apparatus according to claim 1, wherein the sheet holder includes feed cassettes arranged to accommodate a sheet.

5. The apparatus according to claim 1, wherein the second sheet has no wireless tag.

6. The apparatus according to claim 1, wherein the reader and writer are integrated.

7. The apparatus of claim 1, wherein the controller is configured to eject the sheet, which has an orientation rotated 90 degrees with respect to the first sheet, as the second sheet.

8. The apparatus according to claim 1, wherein the wireless tag is a Radio Frequency Identification tag.

9. An information processing apparatus comprising:

a sheet holder arranged to accommodate a sheet;

a conveyer configured to convey the sheet from the sheet holder;

a printer configured to print an image on the conveyed sheet a writer configured to write data to a wireless tag on a plurality of first sheets;

a reader configured to read data from the wireless tag on the first sheets after the writer writes data to the wireless tag; and a memory configured to store a result of a success and failure of reading of the wireless tag on the first sheet by the reader; and a controller configured to eject a second sheet after ejecting a last sheet in each of the plurality of sets of first sheets when executing a job of the first sheets, the job including a same data writing process on each of the plurality of sets of first sheets, wherein the controller is configured to eject the second sheet each time a process for one copy is completed, wherein the controller is configured to eject the sheet, which has an orientation rotated 90 degrees with respect to the first sheet, as the second sheet, and wherein the controller is configured to allow, based on the result of success and failure of reading, the printer to print information on the second sheet for each first sheet of the set of first sheets to indicate that the writer fails to write data.

10. The apparatus according to claim 9, wherein the wireless tag is a Radio Frequency Identification tag.

11. An information processing method comprising:

conveying a sheet;

writing data to a wireless tag on a first sheet;

reading, by a reader, data from the wireless tag on the first sheet after the writer writes data to the wireless tag; and storing a result of success and failure of reading of the wireless tag on the first sheet by the reader; and ejecting a second sheet from a sheet holder after ejecting a last sheet in each of a plurality of sets of first sheets when executing a job of the first sheets, the job including a same data writing process on each of the plurality of sets of first sheets, wherein the second sheet is ejected each time a process for one copy is completed, and wherein the sheet, which has an orientation rotated 90 degrees with respect to the first sheet, is ejected as the second sheet.

12. The method according to claim 11, wherein the sheet, which is larger in size with respect to the first sheet, is ejected as the second sheet.

13. The method according to claim 11, wherein the second sheet has no wireless tag.

14. The method according to claim 11, wherein the wireless tag is a Radio Frequency Identification tag.

* * * * *